(12) United States Patent
Friel et al.

(10) Patent No.: US 8,629,893 B2
(45) Date of Patent: Jan. 14, 2014

(54) VIDEO SWITCHING WITHOUT INSTANTANEOUS DECODER REFRESH-FRAMES

(75) Inventors: Joseph T. Friel, Ardmore, PA (US); Maurice J. Buttimer, Media, PA (US); Alan J. MacDonald, Malvern, PA (US); Michael A. Arnao, Collegeville, PA (US); Andrew P. Weir, Malvern, PA (US); David W. Sowa, Exton, PA (US); J. William Mauchly, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 1444 days.

(21) Appl. No.: 12/061,178

(22) Filed: Apr. 2, 2008

(65) Prior Publication Data

US 2009/0251528 A1     Oct. 8, 2009

(51) Int. Cl.
*H04N 7/14* (2006.01)

(52) U.S. Cl.
USPC ......................................... 348/14.01

(58) Field of Classification Search
USPC ................... 348/14.01–14.08; 375/240.1
See application file for complete search history.

(56) References Cited

U.S. PATENT DOCUMENTS

2005/0248652 A1* 11/2005 Firestone et al. .......... 348/14.09
2007/0199011 A1  8/2007 Zhang et al. ................... 725/1
2007/0206673 A1*  9/2007 Cipolli et al. .............. 375/240.1

FOREIGN PATENT DOCUMENTS

| EP | 0 763 944 A2 | 3/1997 |
| GB | 2 378 601 A | 2/2003 |
| WO | WO 2008/124409 A2 | 10/2008 |

OTHER PUBLICATIONS

International Search Report dated Jul. 16, 2009 cited in Application No. PCT/US2009/038864.
"Advanced Video Coding for Generic Audiovisual Services," XP-017401453, ITU-T Recommendation H.264, Mar. 2005, International Telecommunication Union, ITU-T Draft Study 2005-2008, 341 pgs.
Ye-Kui Wang et al., "Error Resilient Video Coding Using Flexible Reference Frames," XP-030080909, Visual Communications and Image Processing, Proc. of SPIE vol. 5960, Jul. 12, 2005, pp. 691-702.

* cited by examiner

*Primary Examiner* — Curtis Kuntz
*Assistant Examiner* — Maria El-Zoobi
(74) *Attorney, Agent, or Firm* — Merchant & Gould (57) ABSTRACT

A system and method for reducing blurred video caused by intra-coded IDR-frames sent in response to when a destination endpoint in a multipoint videoconference switches to a new video source. An embodiment according to the invention comprises using inter-coded temporal predictive referencing a long term reference frame (LTRF) instead of IDR-frames in a multipoint videoconference system.

24 Claims, 8 Drawing Sheets

FIG. 6

VIDEO SWITCHING WITHOUT INSTANTANEOUS DECODER REFRESH-FRAMES

FIELD OF THE INVENTION

The present invention relates to the field of video communications. More particularly, embodiments according to the present invention relate to methods of encoding and decoding video frames.

BACKGROUND

Video frames sent over a network are compressed because of limited bandwidth. One scheme for video transmission commonly used relies on two types of compressed video frames, Instantaneous Decoder Refresh frames (IDR-frames) and temporal predictive coding frames (P-frames). P-frames use inter-frame coding wherein a video frame is coded in terms of motion vectors and block coding referencing a recently decoded frame. P-frames have the advantage over IDR-frames because they require less bandwidth. However, when an error occurs such as missing a packet, the error can propagate to subsequent video frames. Currently, this problem is solved by sending an IDR-frame to re-establish the video sequence. While IDR-frames have the advantage of having independently coded (intra-coded) video frames they require more bandwidth than P-frames. When bandwidth is limited, IDR-frames may create a blurred video image.

In a multipoint videoconferencing system, a video source, on determining that at least one endpoint unsuccessfully decoded a P-frame, sends an IDR-frame as the next compressed frame. Because most endpoints typically transmit only one video stream, the IDR-frame is sent to all endpoints even if the previous P-frame was successfully decoded by the other endpoints. The situation is the same when a destination endpoint in a multipoint videoconference switches to a new video link. The source of the new video link sends an IDR-frame to establish the reference picture for future P-frames to all endpoints even though not all endpoints needed the IDR-frame.

With multiple video destinations, errors or missing packets multiply in frequency requiring more IDR-frames. When added with IDR-frames being sent for establishing new video links as endpoints switch back and forth between speakers, the potential for video blurring because of limited bandwidth becomes critical in a multipoint videoconference.

In systems where a video source provides video frames that are drastically different from one to the next, the need for an independently coded video frame is reasonable. However, in a video teleconferencing scenario, the background of the conference room, the color and shapes of the objects in the video are unlikely to change during the video stream and the need for IDR-frames becomes less apparent.

A known method for reducing IDR-frames is NEWPRED where the destination decoder provides feedback to a video source encoder. For error recovery, the NEWPRED method uses P-frames referencing a long term reference frame previously sent to and acknowledged by the destination decoder as being successfully decoded. However, this method is currently only applicable to point-to-point applications and to error recovery.

Therefore, what is desired is a system and method that overcomes challenges found in the art, including a method for reducing the number of IDR-frames needed for multipoint video teleconferencing when recovering from errors or when switching to a new video source.

SUMMARY OF THE INVENTION

In order to improve the video quality in a multipoint video teleconference, it is desirable to have a system that uses P-frames to recover from errors or to establish video links with new destination endpoints. Embodiments according to the present invention can be regarded as a multipoint video teleconference system wherein the destination endpoints use long term reference frames and P-frames sent from the video source endpoint to recover from errors, missing packets or to establish a new video link.

In one exemplary embodiment, each endpoint includes both encoders and decoders. The source encoder sends video images encoded to P-frames referencing a recently decoded frame. When an error occurs or when a new destination endpoint establishes a video link with the video source, the source encoder sends a P-frame referencing a preferred long term reference frame (LTRF) which is periodically updated. Messages encoded in the slice header information attached to the P-frame is used for LTRF management.

In one exemplary embodiment, the destination decoders store a preferred LTRF and a plurality of new LTRFs sent from the source encoder. The destination decoder acknowledges to the source encoder when a new LTRF has been successfully decoded and stored. The encoder will assign as the preferred LTRF the most recent new LTRF successfully acknowledged by all decoders in the multipoint videoconference.

In one exemplary embodiment of a method for practicing an aspect of the invention, a method for preserving a video stream after an error in a previous frame or establishing a new video link using P-frames is described. The method comprises using P-frames referencing a periodically updated LTRF instead of IDR-frames.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, specific systems or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of embodiments and the examples included therein and to the figures and their previous and following description.

Embodiments according to the invention can be understood in the context of a multipoint video teleconference system. Note, however, that the invention may be embodied in many different forms and should not be construed as limited to the embodiments set forth herein. For example, the methods embodied according to the invention may be used in any multipoint video streaming system to reduce bandwidth requirements while decreasing the blurring effects from IDR-frames. While embodiments of the invention are described in context of a multipoint videoconference system, other multipoint video streaming applications may find similar benefit in applying the embodiments of this invention.

Figure 1:
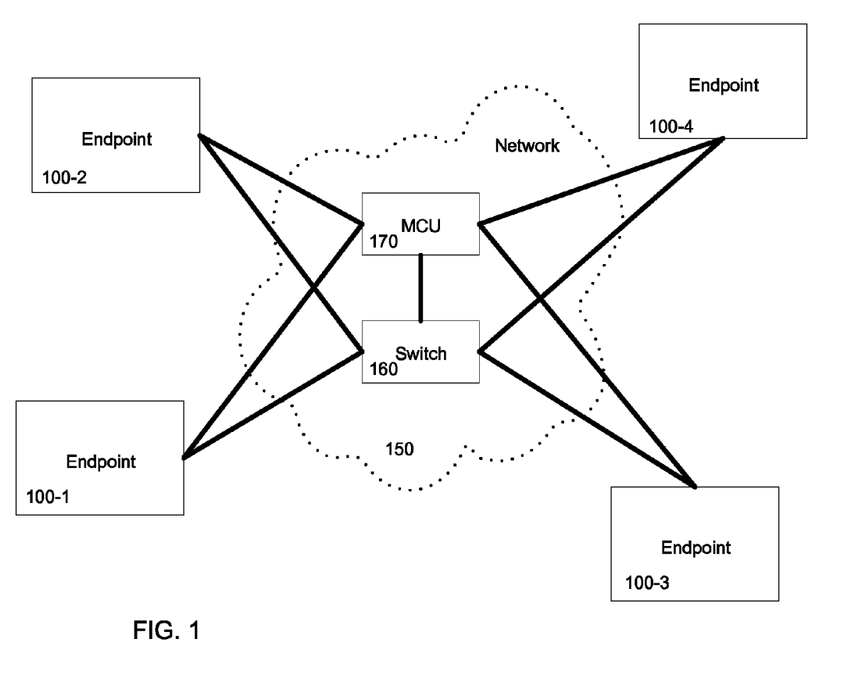
FIG. 1 illustrates an embodiment of a typical multipoint videoconference system with four endpoints.

FIG. 1 illustrates a simplified non-limiting example of a multipoint videoconference system with four endpoints 100-1, 100-2, 100-3, 100-4. In this example, a switch device 160 links the four possible video source encoders from each endpoint 100-1, 100-2, 100-3, 100-4 to the destination endpoint decoders 100-1, 100-2, 100-3, 100-4. A multipoint control unit (MCU) 170 controls the switch 160 based on a plurality of algorithms to determine when a specific destination endpoint decoder 100-1, 100-2, 100-3, 100-4 receives a specific video source. One possible video sourcing arrangement is shown in FIG. 2*a* where one endpoint 100-1 is selected by the MCU 170 to provide the video source to the plurality of endpoints 100-2, 100-3.

Figure 2A:
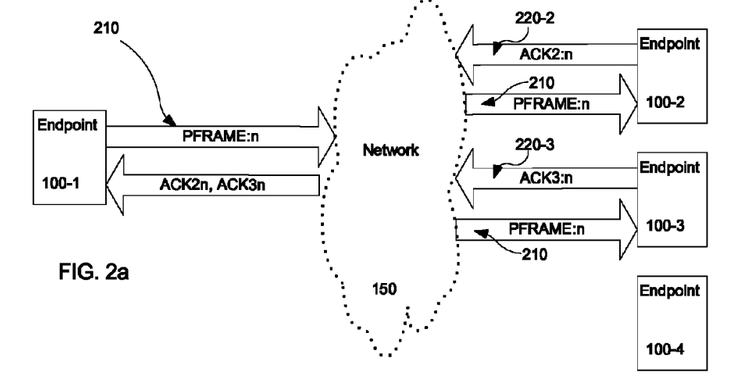
FIG. 2*a* illustrates an embodiment of a multipoint videoconference system with four endpoints where one endpoint provides a video source to two destination endpoints.

In FIG. 2*a*, after establishing a video link with the destination endpoints and setting up the proper reference frames, the video source endpoint 100-1 sends a compressed video data packet 210 to the destination endpoints 100-2, 100-3. The PFRAME:n 210 sent by the video source endpoint is compressed using inter-coding methods referencing a video frame recently decoded by the destination endpoints 100-2, 100-3. After receiving, decoding and properly storing the P-frame 210, each destination endpoint 100-2, 100-3 acknowledges (ACK) 220-2, 220-3 to the video source endpoint 100-1 that PFRAME:n 210 has been successfully decoded. When the destination endpoints 100-2, 100-3 ACK 220-2, 220-3 successful decoding of PFRAME:n, the video source endpoint 100-1 sends the next PFRAME:n+1, and wait for ACK:n+1 from the destination endpoints 100-2, 100-3. This process is repeated until a new destination endpoint 100-4, switches to the same video source endpoint 100-1 currently providing video to other destination endpoints 100-2, 100-3.

Figure 2B:
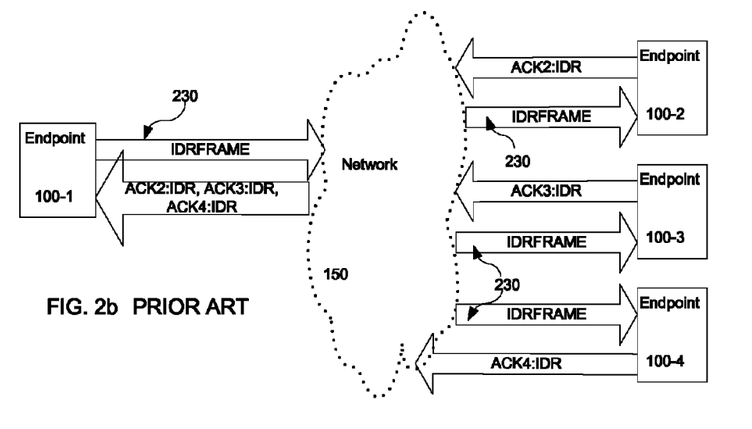
FIG. 2*b* illustrates a prior art embodiment of a multipoint videoconference system with four endpoints where the video source endpoint responds to a destination endpoint switching to the video source currently linked to other endpoints.

FIG. 2*b* illustrates a typical prior art response to a new destination endpoint 100-4 switching to the video link provided by the video source endpoint 100-1. In this illustration, a plurality of destination endpoints 100-2, 100-3 have already established a video link with the video source endpoint 100-1 as in FIG. 2*a*. A new destination endpoint 100-4 establishes a video link to the video source endpoint 100-1 though the switch 160. In this scenario, because the new destination endpoint 100-4 does not have video frames recently decoded by the other destination endpoints 100-2, 100-3, the video source endpoint 100-1 sends an intra-coded IDR-frame 230 to the new destination endpoint 100-4. However, since there is only one video link from the video source endpoint 100-1, the IDR-frame 230 is sent to all destination endpoints 100-2, 100-3, 100-4. Because of the increased bandwidth necessary for IDR-frames, the video image for all destination endpoints 100-2, 100-3, 100-4 may appear blurred and remain blurred for a duration of time.

Figure 2C:
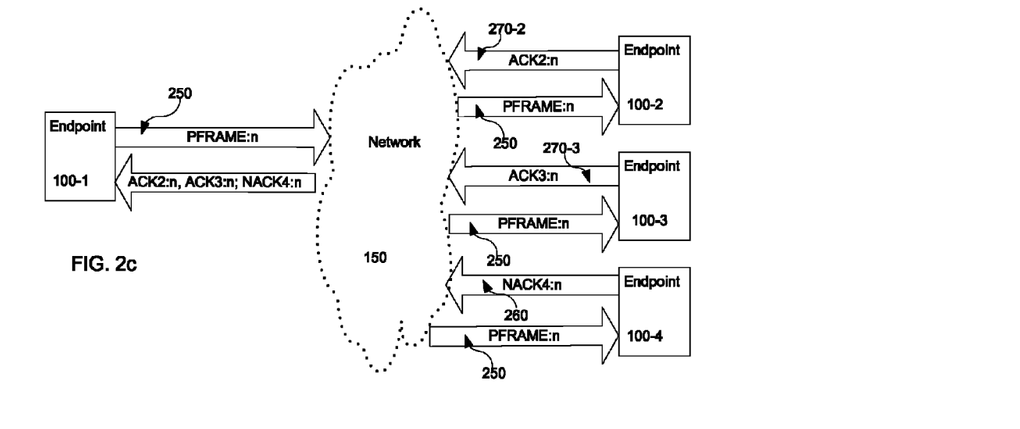
FIG. 2*c* illustrates an embodiment of a multipoint videoconference system with four endpoints where one endpoint provides a video source to three destination endpoints and where one destination endpoint detects an error in decoding video frames sent by the video source endpoint.

FIG. 2*c* illustrates a similar multipoint videoconferencing scenario where the video source endpoint 100-1 is providing a video link to multiple destination endpoints 100-2, 100-3, 100-4. In this illustration the video source endpoint 100-1 sends a PFRAME:n 250 to multiple destination endpoints 100-2, 100-3, 100-4. In response to successfully decoding the PFRAME:n 250, the destination endpoints 100-2, 100-3 send successful ACKs 270-2, 270-3 to the video source endpoint 100-1. However, the video source endpoint 100-1 receives a negative ACK (NACK) 260 from one destination endpoint 100-4 which did not successfully decode PFRAME:n 250.

Figure 2D:
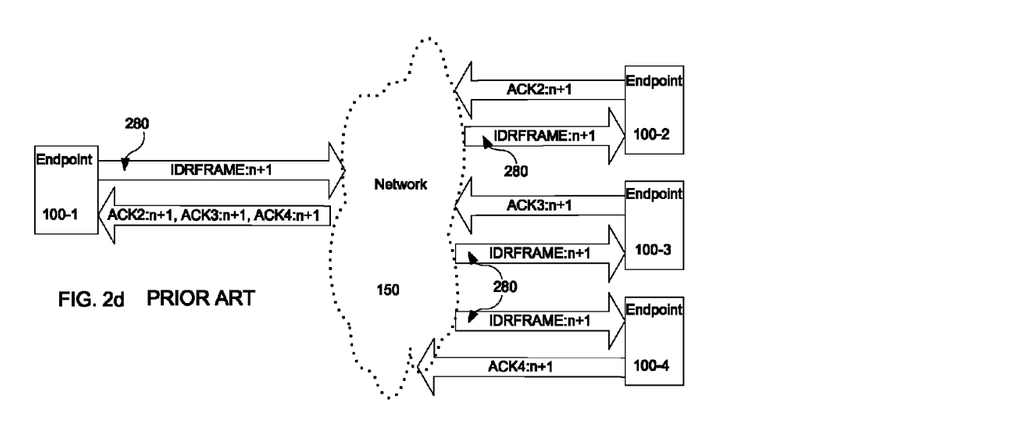
FIG. 2*d* illustrates a prior art embodiment of a multipoint videoconference system with four endpoints where the endpoint providing the video source responds to the error detected in FIG. 2*c*.

FIG. 2*d* illustrates a typical prior art response to the situation described in FIG. 2*c*. After receiving feedback from at least one destination endpoint 100-4 that PFRAME:n 250 was not correctly decoded, the video source endpoint 100-1 sends to the destination endpoints 100-2, 100-3, 100-4 an IDR-frame IDRFRAME:n+1 as the next video frame. While only one destination endpoint 100-4 was unsuccessful at decoding the PFRAME:n 250, all destination endpoints 100-2, 100-3, 100-4 receives the IDR-frame 280 because the video source endpoint 100-1 has only one video link to the switch 160. Because of the increased bandwidth necessary for IDR-frames, the video image for all destination endpoints 100-2, 100-3, 100-4 may appear blurred and remain blurred for a duration of time.

In accordance with embodiments according to the present invention, a video source endpoint encoder sends an initial IDR-frame to the plurality of destination endpoint decoders upon starting a multipoint videoconference. Encoded in the slice header information of the IDR-frame is an instruction to the plurality of destination endpoint decoders to store the resulting decoded IDR-frame as the new LTRF in the first LTRF slot. If all destination endpoint decoders acknowledge successful decoding and storing of the IDR-frame, the new LTRF becomes the preferred LTRF. When there is a need to send an IDR-frame as in the situations illustrated by FIG. 2*a* and FIG. 2*c*, the video source encoder instead sends a P-frame to the plurality of destination endpoint decoders referencing the previously decoded frame stored in the first LTRF slot, the preferred LTRF. If at least one decoder in the plurality of decoders responded with a NACK, the video source encoder continues using IDR-frames, attaching the message instructing the plurality of destination decoders to use it as the initial LTRF until an IDR-frame has been acknowledged by the plurality of destination endpoint decoders. Until all destination endpoint decoders acknowledge the same new LTRF, the video source endpoint encoder will continue to rely on IDR-frames.

Figure 2E:
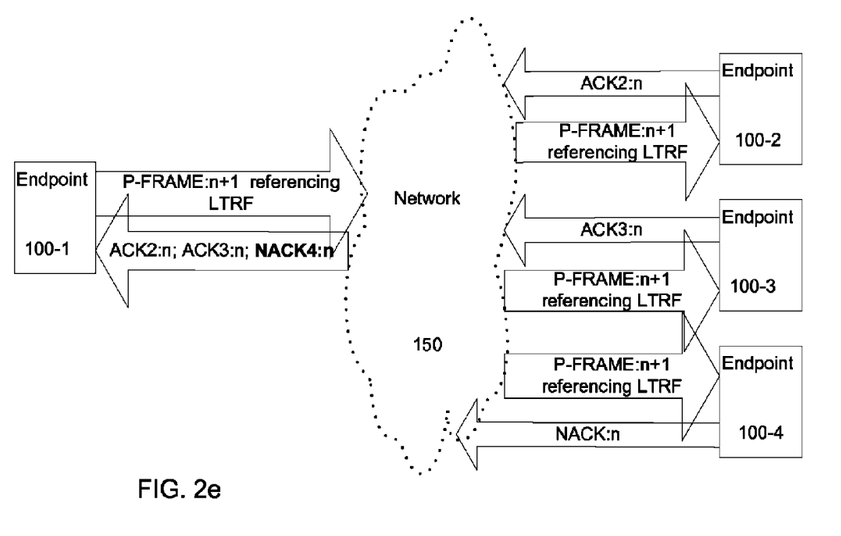
FIG. 2*e* illustrates a multipoint videoconference system where the video source endpoint responds to the conditions of FIG. 2*a* and FIG. 2*c* by applying methods according to one embodiment of the invention.

FIG. 2*e* illustrates a simplified non-limiting example of a multipoint videoconference system responding to the situations of FIG. 2*a* and FIG. 2*c* when applying embodiments according to the invention. After sending P-FRAME:n (not shown in the figure), the video source endpoint encoder receives from two destination endpoint decoders 100-2, 100-3 acknowledgement ACK2:n, ACK3:n of successful decoding of P-FRAME:n. However, one destination endpoint decoder 100-4 detected an error while decoding P-FRAME:n and replied to the video source endpoint encoder 100-1 with a negative acknowledgment NACK:n. In response, instead of sending an IDR-FRAME as in the prior art, the video source endpoint encoder's 100-1 next video frame P-FRAME:n+1 is a P-FRAME referencing the preferred LTRF stored in each destination endpoint decoder. By sending a P-FRAME instead of an IDR-FRAME, the system eliminates any blurring caused by the increased bandwidth needed for an IDR-FRAME.

Figure 3:
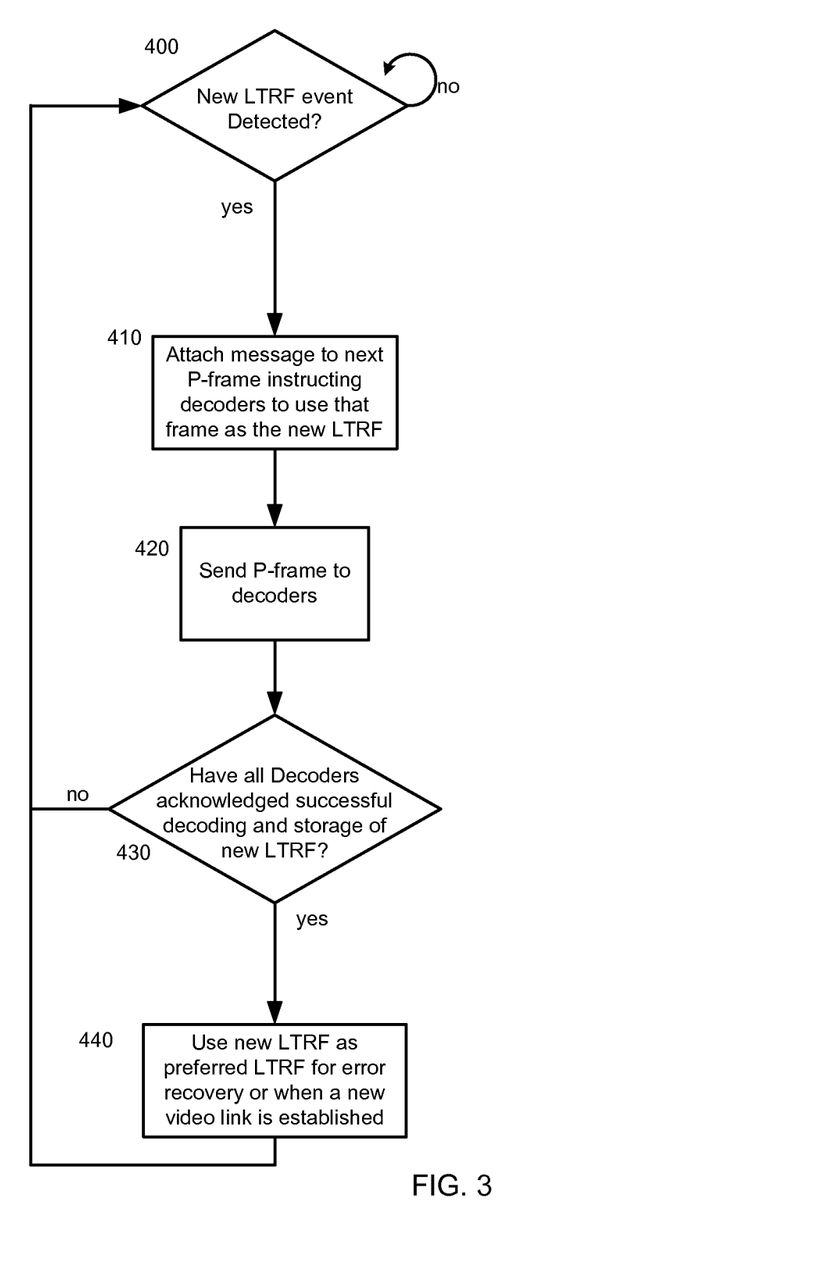
FIG. 3 illustrates an exemplary flow chart describing the steps associated with the logic used by the source encoder endpoint in establishing the preferred long term reference frame.

FIG. 3 illustrates a simplified non-limiting flow diagram of the process used by the video source encoder in sending LTRFs to destination endpoints. After establishing the first preferred LTRF as described above, the video source endpoint encoder may update the LTRF stored in the destination endpoints. In step 400, the video source endpoint encoder waits for a triggering event to initiate the LTRF updating process. This triggering event can be based on a periodic event or can be based on a plurality of other determining factors. In step 410, when the video source endpoint encoder detects this event, it encodes a message on the slice header information of the next available P-frame instructing the destination endpoint decoders to store that P-frame as the new LTRF. The P-frame, with the message attached is sent to the destination endpoint decoders in step 420. After sending the new LTRF, the video source endpoint encoder, in step 430, waits for all destination endpoint decoders to respond. If all destination endpoint decoders acknowledge successful decoding of the new LTRF, then the video source endpoint encoder assigns the new LTRF as the preferred LTRF, i.e. use the new LTRF as the reference frame for error recovery or when a destination endpoint switches over to the video link sourced by that video source endpoint. If one or more destination endpoint decoders respond with a NACK, then the video source endpoint encoder continues to use the previous LTRF already established as the preferred LTRF as a reference frame for error recovery or destination endpoint switching and attempts to assign a new LTRF when an event is again detected in step 400.

Figure 4:
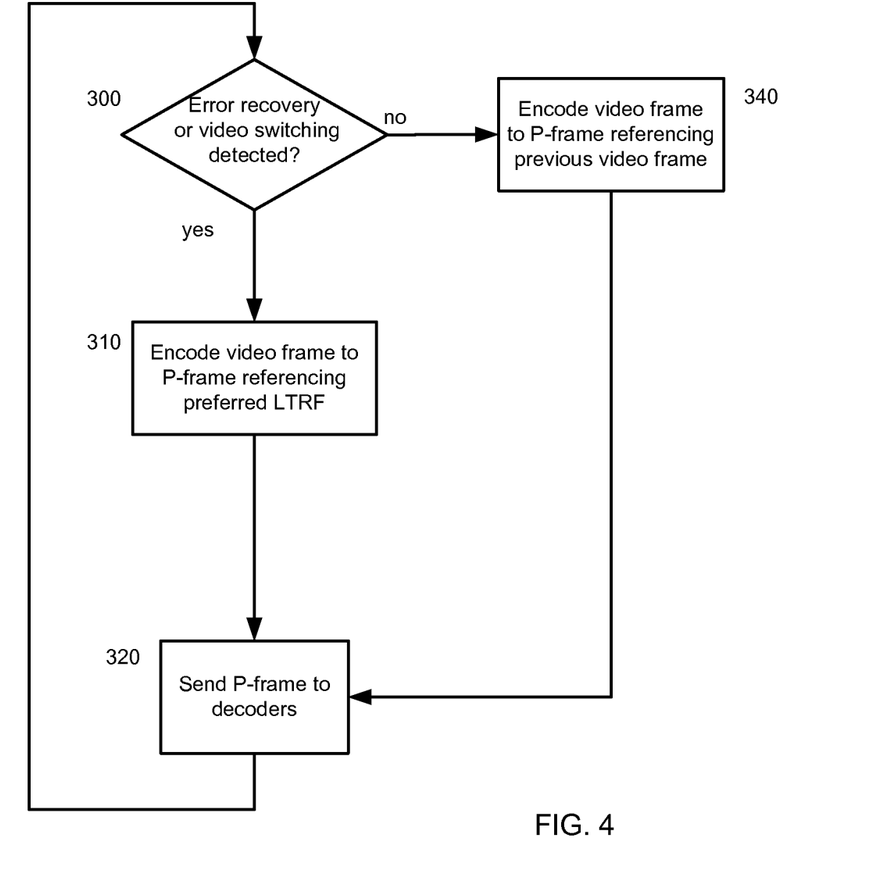
FIG. 4 illustrates an exemplary flow chart describing the steps associated with the logic used by the source encoder endpoint in sending compressed video frames to a plurality of destination decoder endpoints in a multipoint videoconferencing system, according to one embodiment of the invention.

FIG. 4 illustrates a simplified non-limiting block diagram of the process used by the video source endpoint encoder for error recovery and for destination endpoints switching to the video link sourced by the video source endpoint encoder. In step 340, under normal transmissions, the video source endpoint encoder sends P-frames to destination endpoints encoded to reference recently decoded frames. In step 300, the video source encoder determines if at least one of the plurality of destination endpoint decoders has reported an error in the previous video frame, or an endpoint switched to the video link sourced by the video source endpoint encoder. If either condition occurred, the encoder in step 310, encodes the next video frame to a P-frame referencing the preferred LTRF instead of the recently decoded video frame. The encoded frame is then sent to the plurality of destination endpoint decoders in step 320.

Figure 5:
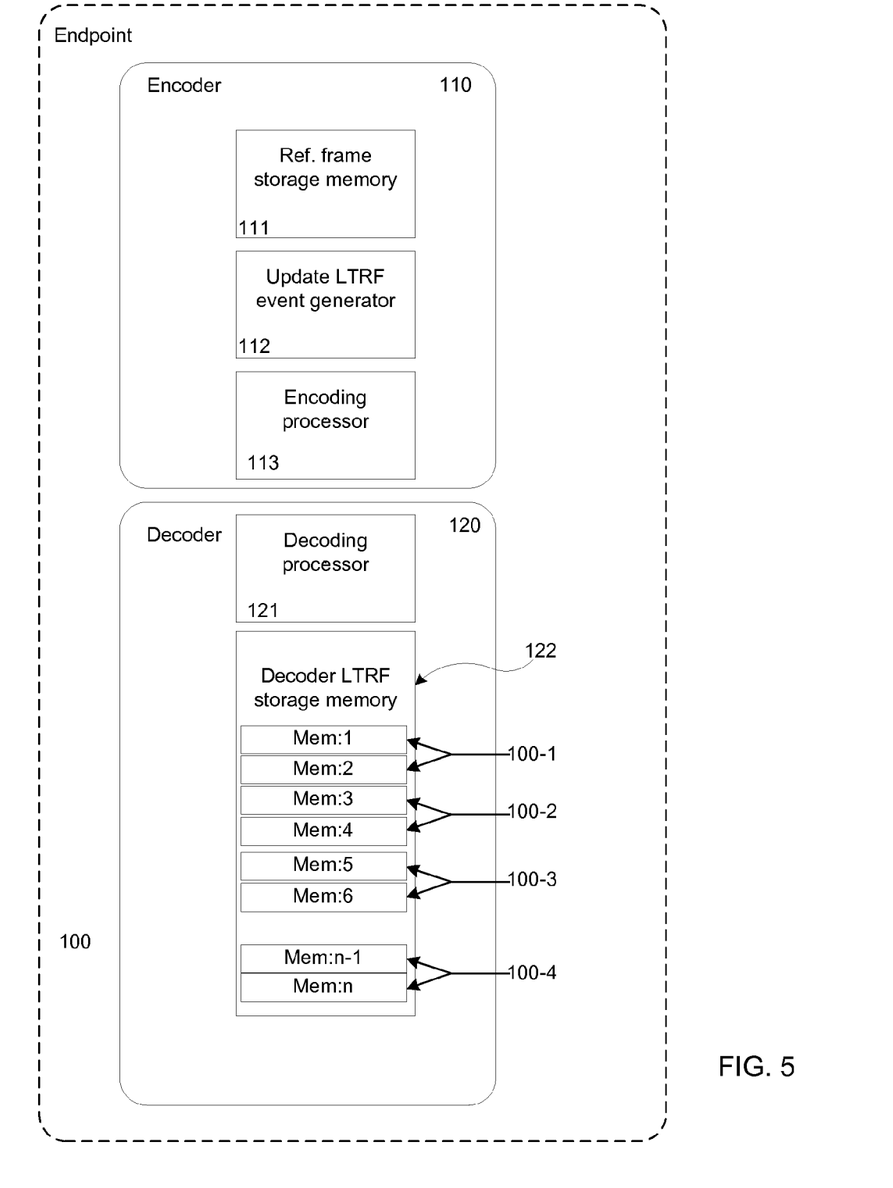
FIG. 5 illustrates a simplified, non-limiting block diagram illustrating selected components of an endpoint.

One non-limiting example of a possible method for managing the new and preferred LTRFs is for each endpoint decoder to have memory locations dedicated to the storage of LTRFs for each video source endpoint encoder. FIG. 5 illustrates a simplified, non-limiting block diagram of components in an endpoint for managing the preferred and new LTRFs. Each endpoint 100 has a decoder 120 and an encoder 110. Each decoder has dedicated memory slots 122 for each of the plurality of encoders from the other endpoints. For example, using the system described in FIG. 1, each endpoint 100-1, 100-2, 100-3, 100-4 would be initialized such that the decoder for the plurality of endpoints have the same memory slots 122 assigned for storing LTRFs from the plurality of endpoint encoders. As illustrated in FIG. 5, the first two memory slots mem:1, mem:2 are reserved for the first endpoint 100-1, the next two memory slots mem:3, mem:4 are reserved for the second endpoint 100-2, the third pair of memory slots mem:5, mem:6 is reserved for the third endpoint 100-3, and the fourth pair of memory slots mem:n−1, mem:n is reserved for the fourth endpoint, 100-4.

When the first endpoint sends the initial new LTRF, the encoder for the first endpoint attaches a message instructing the plurality of decoders to store the decoded video frame in the first memory slot mem:1 assigned to the first endpoint. If the plurality of endpoint decoders acknowledge successfully decoding and storing the initial new LTRF in the first memory slot mem:1, the first endpoint encoder stores in its reference frame storage memory 111 the new LTRF and its memory location mem:1 in the plurality of endpoint decoders as the preferred LTRF. If the plurality of decoders returned at least one NACK, then the first endpoint encoder did not successfully establish the initial new LTRF and continues sending the initial new LTRF until the plurality of decoders all acknowledge successfully decoding and storing the new LTRF.

In one embodiment, after the initial LTRF has been successfully decoded and assigned as the preferred LTRF, on the detection of a triggering event, the first endpoint encoder 110 sends a new LTRF to the plurality of destination decoders. The first endpoint encoder 110 encodes to the slice header information of the P-frame, a message instructing the plurality of endpoint decoders 120 to store the new LTRF in a memory slot mem:2 assigned to the first endpoint 100-1 that is not currently storing the preferred LTRF mem:1. Upon acknowledgment that the plurality of destination decoders 120 successfully decoding and storing the new LTRF to the new memory slot mem:2, the first endpoint encoder stores in its reference frame storage memory 111 the new LTRF and the memory location mem:2 in the plurality of destination decoders as the preferred LTRF. Because the second memory slot mem:2 now stores the preferred LTRF, the first memory slot mem:1 is available to be used for new LTRFs when the next one is sent by the encoder 110. By switching back and forth between two memory slots. The system is able to use previously stored LTRFs until such time that a new LTRF has been successfully decoded and stored by the plurality of endpoint decoders.

If the new LTRF was not successfully decoded and stored by at least one of the plurality of destination endpoint decoders 120, the endpoint encoder 100 continues to use the current preferred LTRF stored in the first memory location mem:1 for error recovery and switching and at the detection of another triggering event, send a new LTRF to the same memory slot mem:2 of the plurality of endpoint decoders until all endpoint decoders acknowledge successfully decoding and storing the new LTRF in the designated memory slot mem:2.

This method is repeated for the plurality of encoders with the second endpoint 100-2 using the next pair of memory slots mem:3, mem:4, the third endpoint 100-3 using the third pair of memory slots mem:5, mem:6, and the fourth endpoint 100-4 using the fourth pair of memory slots mem:n−1, mem:n.

Figure 6:
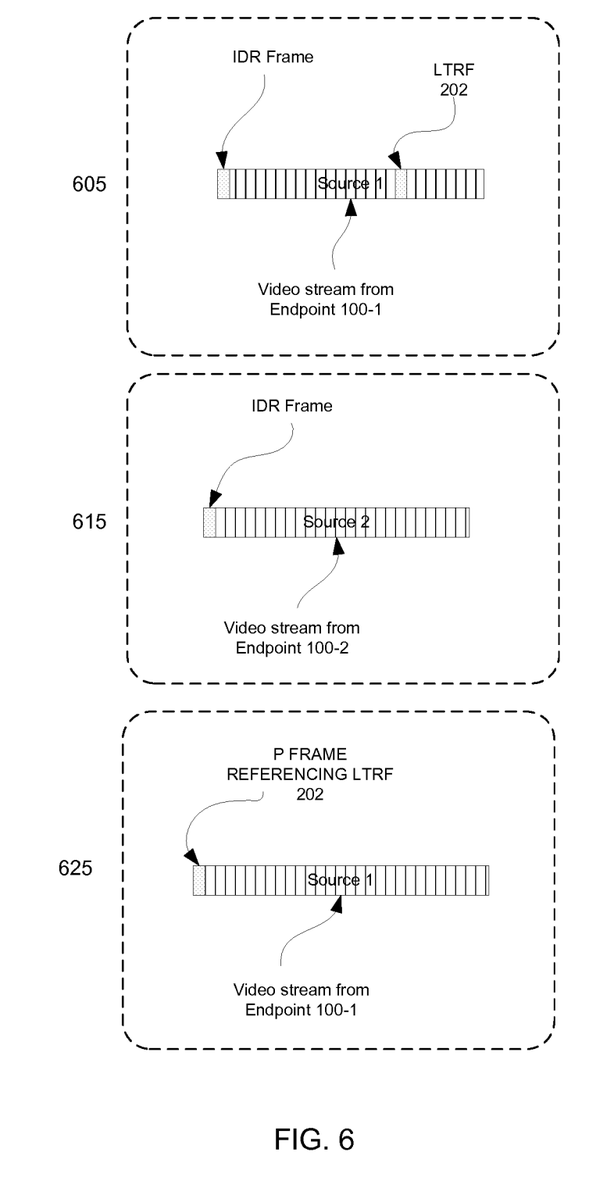
FIG. 6 illustrates a simplified, non limiting diagram of an endpoint using two video streams.

In an embodiment, the method describes a system which includes a plurality of encoders to manage storage of LTRFs in the memory of a plurality of decoders. By storing a LTRFs from the plurality of encoders, P-frames referencing LTRFs can be used when an encoder resumes sending video to the decoder. A simplified example of this process is shown in FIG. 6.

In this example, a video stream is received by a decoder at Endpoint 100-3. Within this single received stream, the video from two different endpoints are switched back and forth. The first video stream 605 from a first endpoint 100-1, is followed by a second video stream 615 from a second endpoint 100-2, which is then followed by a third video stream 625 from the first endpoint 100-1 again. The decoder decodes one stream at a time. Since the two endpoints 100-1, 100-2 are establishing a video stream 605, 615 for the first time with the receiving endpoint 100-3, the first and second video streams 605, 615 are initiated with an IDR frame.

Some time during the first video stream 605, the decoder is signaled to save a particular frame of that video sequence as a long-term reference frame LTRF 202. When Source 1 is restarted 625 (after decoding the second source 615) the first frame is a P frame which references the saved LTRF 202.

In one embodiment, the decoder has the capability to retain the LTRFs while decoding video from other sources and keeps at least one LTRFs for each video source that may be switched into its stream. Note, each encoder operates independently, without communicating with the other encoders. Each encoder in the plurality of encoders has the ability to use, create and delete LTRFs in the storage memory of the decoders at other endpoints. To maintain the LTRFs, each endpoint avoids using or deleting LTRFs created by other encoders. FIG. 5 shows one method used for maintaining and organizing the LTRFs in a decoder.

In an embodiment, when an endpoint is newly designated the current speaker, that endpoint is signaled to send or resume sending video. If that endpoint has established a LTRF in all the currently attached decoders, then the endpoint can resume by sending a P-frame referencing a LTRF. However, if the LTRF has not been established in all the currently attached decoders, the decoder sends an IDR frame 605, 615.

In one embodiment the decoder works according to the H.264 video encoding standard, allowing 16 reference frames to be held in decoder memory. In this embodiment, eight encoders can simultaneously maintain a pair of LTRF locations in the decoders. The 16 memory locations or "slots" for LTRFs are assigned, at the beginning of the multipoint call, to the endpoints which will control them. In this case the decoder can be a "standard decoder;" having no special knowledge that the methods described here are taking place and operates to the commands given to it within the H.264 standard bitstream.

In another embodiment the decoder has special features outside the H.264 spec increasing the number of references frames that can be stored. For example 128 or 256 memory locations will enable switching between 64 or 128 different source encoders respectively. In this embodiment, information within the incoming video stream uniquely identifies the source encoder (endpoint) that created the stream, allowing the decoder to maintain a separate LTRF storage area for each encoder, thus reducing the need for the encoders to have knowledge or agreement about where the LTRFs are stored.

In one embodiment the MCU determines when P-frames or IDR frames should be sent. The MCU has knowledge of all the endpoints and decides which ones are currently streaming to the others. It also has knowledge of any new endpoints as soon as they join the conference call. The MCU, using a plurality of algorithms, generally is tasked with determining the video streams for the plurality of endpoints. Therefore the MCU has the information to decide whether the source endpoint should send an IDR or use a P-Frame.

In another embodiment the MCU signals the encoders with information on what decoders are currently attached. The individual encoders can then decide whether to send an IDR or a P-frame referencing an LTRF.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for managing video images in a multipoint videoconference comprising:
   receiving by a decoder, a first video signal from a first video source encoder, the first video signal comprising a temporal predictive frame (P-frame), the P-frame coded in terms of motion vectors and block coding, and references a recently decoded P-frame:
   decoding the received P-frame based on the referenced recently decoded P-frame and sending an acknowledgement to the first video source upon successful decoding, else sending an un-acknowledgement to the first video source;
   receiving from the first video source, in response to the un-acknowledgement, a next P-frame, the next P-frame referencing to a long term reference frame (LTRF) stored in a memory on the decoder, wherein the LTRF is an instantaneous decoder refresh frame (IDR-frame) associated with the first video signal, and wherein the LTRF is updated based on at least one of: a triggering event and periodically; and
   decoding by the decoder, the received next P-frame using the LTRF as a reference frame.

2. The method of claim 1, further comprising:
   receiving by the decoder a message from the first video source encoder to store a current decoded P-frame as the LTRF; and
   updating, by the decoder, the LTRF associated with the first video signal stored in the memory on the decoder with the current decoded P-frame.

3. The method of claim 2, wherein updating by the decoder, the LTRF associated with the first video signal comprises the decoder acknowledging a successful decoding and storage of the current decoded P-frame as the LTRF.

4. The method of claim 2, wherein updating by the decoder the LTRF associated with the first video signal comprises:
   ensuring by the decoder that the LTRF for the first video source encoder is stored in a distinct location in the memory; and
   storing by the decoder more than one LTRF for each video source encoder in a plurality of video source encoders.

5. The method of claim 4, wherein storing more than one LTRF for each video source encoder in the plurality of video source encoders comprises:
   storing a first LTRF from the first video source encoder to a first location in memory;
   storing a second LTRF from the second video source encoder to a second location in memory;
   using the first LTRF from the first video source encoder as the reference frame for the first video source encoder if a plurality of decoders in the multipoint videoconference acknowledges successfully receiving the first LTRF;
   using the second LTRF from the second video source encoder as the reference frame from the second video source encoder if the plurality of decoders in the multipoint videoconference acknowledges successfully receiving the second LTRF;
   using the first location in the memory to store a new LTRF from the first video source encoder once the plurality of decoders all acknowledge successfully receiving the second LTRF; and
   using the second memory location to store the new LTRF from the second video source encoder once the plurality of decoders all acknowledge successfully receiving the new LTRF.

6. The method of claim 1, wherein decoding by the decoder, the next P-frame using the LTRF as a reference frame comprises:
   receiving by the decoder, the next P-frame referencing the LTRF stored in the memory on the decoder; and
   using in a plurality of decoders, the LTRF for a given video source encoder.

7. The method of claim 6, wherein the plurality of decoders include decoders at different endpoints in a multipoint videoconference.

8. The method of claim 6, wherein the plurality of decoders include multiple decoders at an endpoint in a multipoint videoconference where the multiple decoders are operable in parallel to each decode a different part of the video frame.

9. A method for managing video images in a multipoint video conference comprising:
   sending from a first video source encoder, an instantaneous decoder refresh frame (IDR-frame) associated with a first video signal and an instruction to store a resulting decoded IDR-frame as a long term reference frame (LTRF) to a plurality of decoders in the multipoint video conference, wherein each of the plurality of decoders are configured to store the LTRF on a memory, and wherein the LTRF is updated based on at least one of: a triggering event or a periodic basis;
   receiving, by the first video source encoder, a signal from a Multi-point Control Unit (MCU); and
   responsive to receiving the signal from the MCU, sending from the first video source encoder a temporal predictive frame (P-frame), the P-frame predictively coded based on the LTRF stored in the memory on each of the plurality of decoders.

10. The method of claim 9, wherein sending from the first video source encoder the LTRF to the plurality of decoders comprises sending a plurality of LTRFs during the duration of the multipoint videoconference.

11. The method of claim 9, wherein sending from the first video source encoder the LTRF to the plurality of decoders comprises sending the LTRF based on an occurrence of an event.

12. The method of claim 11, wherein the event comprises a periodic event.

13. The method of claim 9, wherein sending from the first video source encoder, the LTRF to the plurality of decoders comprises the first video source encoder sending a message attached to the P-frame indicating to the plurality of decoders that the P-frame is to be used as the LTRF if successfully decoded.

14. The method of claim 9, wherein receiving by the first video source encoder, the signal from the MCU comprises receiving from the MCU a signal indicating that at least one decoder in the plurality of decoders has switched to the first video signal.

15. The method of claim 9, wherein responsive to receiving the signal from the MCU, sending from the first video source encoder the P-frame predictively coded based on the LTRF comprises sending from the video source encoder the P-frame to the plurality of decoders referencing the LTRF for decoding the video image.

16. A system for managing a multipoint videoconference comprising:
   a video switching device operably connected to a plurality of endpoints, wherein the video switching device is configured to provide a plurality of video sources from a plurality of endpoints to other endpoints in the multipoint videoconference;

a multi-point control unit (MCU) operably connected to the video switching device and a network, wherein the MCU is configured to monitor and control a plurality of video links provided by a plurality of video decoders and a plurality of video encoders associated with the plurality of endpoints; and the plurality of endpoints operably connected with the network, wherein the plurality of endpoints are configured to: use an inter-coded temporal prediction frame (P-frame) referencing a long term reference frame (LTRF) to decode a video image from a video source encoder associated with an endpoint, wherein the LTRF is an instantaneous decoder refresh frame (IDR-frame) associated with the video image and is stored on a memory on each of the plurality of video decoders, and wherein the LTRF is updated based on at least one of: a triggering event or a periodic basis.

17. The system of claim 16, wherein the MCU is further configured to send a message to the video source encoder when at least one decoder in the plurality of endpoints is switching to the video source encoder.

18. The system of claim 16, wherein the LTRF associated with the video source encoder is stored at the plurality of endpoints such that a new LTRF does not override the stored LTRFs until each of the plurality of endpoints have acknowledged successful decoding and storage of the new LTRFs.

19. The system of claim 16, wherein each of the plurality of endpoints stores a plurality of LTRFs associated with the plurality of endpoints in a multipoint videoconference.

20. The system of claim 16, wherein each of the plurality of endpoints are further configured to use a preferred LTRF to decoding the P-frame.

21. The system of claim 16, wherein the video source encoder associated with the endpoint is further configured to send the LTRF to all other endpoints in the multipoint videoconference.

22. The system of claim 21, the video source encoder associated with the endpoint is further configured to attach a message to the P-frame indicating to the other endpoints that a current decoded frame is to be used as the LTRF.

23. The system of claim 21, wherein the video source encoder associated with the endpoint being further configured to periodically send a new LTRF.

24. The system of claim 16, wherein the video source encoder associated with the endpoint is further configured to send the P-frame referencing a preferred LTRF when at least one endpoint in the plurality of endpoints switches to the video source encoder for a video source.

* * * * *